United States Patent
Wirtanen et al.

(10) Patent No.: US 10,165,485 B2
(45) Date of Patent: Dec. 25, 2018

(54) METHOD FOR SELECTING A CELLULAR NETWORK

(71) Applicant: BlackBerry Limited, Waterloo (CA)

(72) Inventors: Jeffrey William Wirtanen, Ottawa (CA); Muhammad Khaledul Islam, Ottawa (CA); Yi Hai Zhang, Ottawa (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 15/880,024

(22) Filed: Jan. 25, 2018

(65) Prior Publication Data

US 2018/0152872 A1    May 31, 2018

Related U.S. Application Data

(63) Continuation of application No. 14/555,645, filed on Nov. 27, 2014, now Pat. No. 9,942,816.

(51) Int. Cl.
| | |
|---|---|
| H04W 36/14 | (2009.01) |
| H04W 72/04 | (2009.01) |
| H04W 48/16 | (2009.01) |
| H04W 84/04 | (2009.01) |
| H04W 48/04 | (2009.01) |

(52) U.S. Cl.
CPC ........... *H04W 36/14* (2013.01); *H04W 48/16* (2013.01); *H04W 72/048* (2013.01); *H04W 48/04* (2013.01); *H04W 84/042* (2013.01)

(58) Field of Classification Search
CPC ... H04W 36/14; H04W 72/048; H04W 48/04; H04W 48/16; H04W 84/04
See application file for complete search history.

(56) References Cited

U.S. PATENT DOCUMENTS

| | | |
|---|---|---|
| 8,060,106 B1 | 11/2011 | Lan |
| 8,364,142 B1 | 1/2013 | Berberian et al. |
| 2011/0256869 A1 | 10/2011 | Zhang |
| 2012/0309391 A1 | 12/2012 | Zhang et al. |
| 2014/0241184 A1 | 8/2014 | Sami |

(Continued)

FOREIGN PATENT DOCUMENTS

| | | |
|---|---|---|
| CA | 2540388 V | 9/2006 |
| EP | 1740001 A1 | 7/2005 |

(Continued)

OTHER PUBLICATIONS

European Patent Office, Extended European Search Report for Application No. 15862311.6-1214 / 3225057, PCT/CA2015051214, dated May 4, 2018.

(Continued)

*Primary Examiner* — King Poon
*Assistant Examiner* — Vincent Peren
(74) *Attorney, Agent, or Firm* — Moffat & Co (57) ABSTRACT

A method performed by a mobile device of selecting a cellular network entails activating a cellular radio transceiver, scanning a most recently used frequency list of radiofrequency channels most recently used by the cellular radio transceiver of the mobile device, scanning a likely frequency list of likely radiofrequency channels available at a plurality of locations where activation of cellular radio transceivers commonly occurs, and selecting the cellular network by identifying one of the radiofrequency channels as a usable channel.

19 Claims, 5 Drawing Sheets

(56) References Cited

U.S. PATENT DOCUMENTS

2014/0342732 A1 11/2014 Manalo
2015/0056985 A1 2/2015 Swaminathan

FOREIGN PATENT DOCUMENTS

EP 1819184 A1 8/2007
EP 3009861 A1 4/2016

OTHER PUBLICATIONS

International Searching Authority / Canadian Intellectual Property Office, International Search Report on Application No. PCT/CA2015/051214, dated Feb. 9, 2016.
3rd Generation Partnership Project, 3GPP TS 123.122 version 12.5.0 Release 12, dated Oct. 2014.
International Bureau, International Preliminary Report on Patentability for International Application No. PCT/CA2015/051214, dated Jun. 8, 2017.

METHOD FOR SELECTING A CELLULAR NETWORK

TECHNICAL FIELD

The present disclosure relates generally to wireless communications and, in particular, to cellular network selection techniques.

BACKGROUND

When the user of a mobile device travels to a foreign country by air, the user typically shuts off the mobile device or activates "airplane mode" prior to taking off in order to deactivate the cellular radio transceiver and possibly radio transceivers of other radio access technologies (RAT) such as Wi-Fi®. Upon reaching the destination when usage of cellular radio is permitted, the user may decide to reactivate the cellular radio transceiver. Upon reactivation of the cellular radio transceiver, a 3GPP-compliant mobile device generally known as a User Equipment (UE) initially attempts to find the last registered public land mobile network (R-PLMN) or equivalent public land mobile network (E-PLMN) to perform a Location Registration by scanning all RATs with which the mobile device is capable of communicating. If no cellular radio coverage is available from the last registered PLMN (which is the case when the user travels to a foreign country), then the mobile device initiates a network scan to attempt registration on other PLMN/RAT combinations according to a 3GPP-specified order such as starting with the RAT priority specified in Home PLMN (HPLMN) and Equivalent Home PLMN (EH-PLMN) Elementary File (EF) on a subscriber identity module (SIM) or universal subscriber identity module (USIM) followed by User Controlled PLMN Selector with Access Technology EF followed by Operator Controlled PLMN Selector with Access Technology EF and so on (as specified by 3GPP TS 23.122).

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Because of the large number of radio frequency (RF) bands supported on each RAT by a typical 3GPP UE (mobile device), it may take quite a while for a typical 3GPP-compliant mobile device to select a cellular network that provides service to the user after landing in a foreign country. This delay in providing service to the user may be exacerbated in some specific mobile device implementations that always trigger a network scan for the home network after switch on if the Last RPLMN Selection Indication EF on the SIM/USIM is enabled by the network operator. As a result, a typical 3GPP-compliant mobile device may take up to 2-4 minutes before it is able to provide service to the user after airplane mode is turned off upon arriving in a foreign country. This leads to a poor user experience. The user is also subjected to a similar experience when the user returns home especially with a SIM that does not have the Last RPLMN Selection Indication EF configured.

With the ever-increasing number of radiofrequency (RF) bands and RATs that a typical 3GPP-compliant mobile device expected to support, this will get worse. For example, a mobile device may support Long Term Evolution (LTE) RF bands 1, 2, 3, 4, 5, 6, 8, 13, 17, 20, 25, 26, 28, 39, 40, 41, Universal Mobile Telecommunication System (UMTS) RF bands 1, 2, 4, 5/6, 8 and quad-band Global System for Mobile Communications (GSM). A typical mobile device implementation of network scan after power on involves performing one or more scans of Most Recently Used (MRU) cellular systems followed by a full exhaustive scan of all supported RF bands on all supported RATs (i.e. a full RAT/band scan). The MRU list stores cell identification parameters of a fixed number of last used cells in a non-volatile memory of the mobile device, e.g. the MRU list may comprise 10 UMTS cells and 10 LTE cells and cell identifiers could be the PLMN identifier and associated downlink UTRA Absolute Frequency Number (UARFCN) as defined in 3GPP TS 25.101 for UMTS cells or downlink E-UTRA Absolute Frequency Number (EARFCN) as defined in 3GPP TS 36.101 for LTE cells. MRU scans on specified frequencies (UARFCN/EARFCN) are quite fast compared to exhaustive scan of all frequencies within a given band hereafter called full band scans. The duration of full band scan which is much longer and can vary depending on the bandwidth of the spectrum of the band (e.g. 10 MHz vs. 75 MHz) and the presence of signals from other RATs within the spectra that may lead to false alarms while performing full scan assuming a particular RAT (e.g. presence of GSM signals during UMTS RAT scan). In general, MRU scans are quite effective when the user remains in the user's home network as the likelihood of the mobile device still being in the coverage of one of the last visited home cells is quite high; however, it does not help much when the user travels to a foreign country because there will not be any MRU entry for any cell from any foreign PLMN or when the user travels back home after visiting a foreign country as in this case the MRU list is likely to be filled with visiting PLMN entries. There are also other scenarios when the MRU scan is not effective e.g. if the user decides to change SIM, e.g. a subscriber of a network operator X1 may decide to switch to a new SIM that belongs to a network operator Y1 after landing in the country Y and switch back to his/her home SIM (i.e. SIM X1) after returning home; in both cases (going abroad and coming back home), the current MRU contents may no longer be relevant as the MRU entries represent the networks associated with the SIM prior to SIM switch. An improved method for selecting a cellular network is thus highly desirable.

On activation of a cellular radio transceiver of a mobile device, it is desirable for the mobile device to find a cellular network channel quickly in order to provide service to the end user. However, mobile devices today need to scan an ever-growing set of cellular RF bands and RATs. For example, a cellular radio transceiver of a mobile device may operate on one or more cellular RF bands per RAT. For example, for LTE, these may be bands 1, 2, 3, 4, 5, 7, 8, 13, 17, 20, 25, 26, 28, 39, 40, 41 (i.e. on 2100, 1900, 1800, 1700, 850, 2600, 900, 700, 700, 800, 1900, 800, 700, 1900, 2300, 2500 MHz, respectively). For example, for HSPA+, bands 1, 2, 4, 5/6, 8 (i.e. 2100/1900/1700/850/900 MHz, respectively) may be used. For example, a quad-band GSM/GPRS/EDGE transceiver may use bands at the frequencies of 850/900/1800/1900 MHz. Scanning through these various bands can take a significant amount of time to complete while also depleting the battery. A method to expedite cellular network selection is therefore highly desirable.

The present specification discloses a method, computer-readable medium and mobile device that expedite cellular network selection. In general, the network is selected by scanning a most recently used frequency list and a likely frequency list composed of the most likely or probable frequencies available a plurality of locations where transceiver activation occurs most commonly, e.g. at airports where the user disables airplane mode upon landing that reactivates cellular radio transceiver. In general, instead of performing multiple successive scans of most recently used (MRU) frequencies or a MRU scan followed by a full band/RAT scan or just a full band/RAT scan, it is much more effective if a focused scan is performed on a set of likely deployed frequencies in conjunction with the MRU frequencies when the cellular radio transceiver is re-activated, e.g. when airplane mode is disabled. The likely frequencies can be selected in a prioritized order based on the status of service prior to turning airplane mode on, usage/change of SIM/USIM when airplane mode is turned off and/or various other criteria which are described below.

Accordingly, in general terms, one aspect of the present disclosure is a method performed by a mobile device of selecting a cellular network. This method entails activating a cellular radio transceiver, scanning a most recently used frequency list of radiofrequency channels most recently used by the cellular radio transceiver of the mobile device, scanning a likely frequency list of likely radiofrequency channels available at a plurality of locations where activation of cellular radio transceivers occurs, and selecting the cellular network by identifying one of the radiofrequency channels as a usable channel.

Another aspect of the present disclosure is a computer-readable medium comprising instructions in code which when loaded into a memory and executed by a processor of a mobile device cause the mobile device to activate a cellular radio transceiver, scan a most recently used frequency list of radiofrequency channels most recently used by the cellular radio transceiver of the mobile device, scan a likely frequency list of likely radiofrequency channels available at a plurality of locations where activation of cellular radio transceivers occurs and select the cellular network by identifying one of the radiofrequency channels as a usable channel.

Yet another aspect of the present disclosure is a mobile device having a processor coupled to a cellular radio transceiver for activating the cellular radio transceiver and a memory coupled to the processor for storing a most recently used frequency list of radiofrequency channels most recently used by the cellular radio transceiver of the mobile device and for storing a likely frequency list of likely radiofrequency channels available at a plurality of locations where activation of cellular radio transceivers commonly occurs. The processor is configured to scan the most recently used frequency list and the likely frequency list and to select the cellular network by identifying one of the radiofrequency channels as a usable channel.

The details and particulars of these aspects of the disclosure will now be described below, by way of example, with reference to the drawings.

The likely frequency list is composed of frequencies (channels) that are available at locations where RF transceiver activation is most likely to occur. In one implementation, the locations where RF transceiver activation occurs most commonly are airports. In other words, RF transceivers are frequently disabled before a flight and then reactivated on landing. Upon arrival in another city or country, the mobile device must scan for a network which can provide roaming service.

Given that the cellular radio frequency bands are assigned by the regulatory body in a given country and a given network operator is allocated only a certain portion of the frequency bad, it is quite common that there are some common frequencies that are deployed in every airport of the country that the network operator serves. In fact, for RATs that require wide RF bandwidth such as FDD LTE which may have 20 MHz system bandwidth, the number carrier frequencies that can be deployed is quite small compared to a RAT that requires much smaller RF bandwidth such as GSM. In addition, some RF bands such 700-MHz bands are limited in bandwidth; as a result, there can be only a very limited number of carrier frequencies that can be deployed in these bands. For example, LTE band 13 and 17 have bandwidths of 10 and 12 MHz, respectively, and are used by North American network operators who have deployed just a single 10-MHz FDD LTE carrier frequency thus making the centre frequency of band 13 or band 17 the same across all locations in the country. Some examples are tabulated below to show the UTRA Absolute Radio Frequency Channel Number (UARFCN), where UTRA stands for UMTS Terrestrial Radio Access and the Evolved-UTRA Absolute Radio Frequency Channel Number (EARFCN) deployment in UMTS WCDMA (Wideband Code Division Multiple Access) and LTE FDD (Frequency Division Multiplexing) cells respectively by network operators in various US airports:

| Network Operator | RAT | US airports | | | |
|---|---|---|---|---|---|
| | | IAD | BOS | EWR | ORD |
| X1 | LTE-FDD | $EARFCN_{X11}$ $EARFCN_{X12}$ | $EARFCN_{X11}$ | $EARFCN_{X11}$ | $EARFCN_{X11}$ $EARFCN_{X13}$ |
| | UMTS-WCDMA | $UARFCN_{X12}$ $UARFCN_{X13}$ | $UARFCN_{X11}$ | $UARFCN_{X12}$ $UARFCN_{X13}$ | $UARFCN1_{X2}$ $UARFCN_{X13}$ |
| X2 | LTE-FDD | $EARFCN_{X21}$ $EARFCN_{X23}$ | $EARFCN_{X21}$ | $EARFCN_{X21}$ | $EARFCN_{X21}$ $EARFCN_{X22}$ |
| X3 | LTE-FDD | $EARFCN_{X31}$ | $EARFCN_{X31}$ | $EARFCN_{X31}$ | $EARFCN_{X31}$ $EARFCN_{X32}$ |

In the above table the carrier and radio access technology are shown for the following airports (which are selected solely by way of example): Washington Dulles International Airport (IAD), Logan International Airport (Boston), Newark Liberty International Airport (EWR), Chicago O'Hare International Airport (ORD).

The following table shows the UARFCN and EARFCN deployment in various Canadian airports, notably in Ottawa (YOW), Toronto (YYZ), Montreal (YUL) and Vancouver (YVR).

| Network Operator | RAT | Canadian Airports | | | |
|---|---|---|---|---|---|
| | | YOW | YYZ | YUL | YVR |
| Y1 | LTE-FDD | $EARFCN_{Y11}$ $EARFCN_{Y12}$ | $EARFCN_{Y11}$ $EARFCN_{Y13}$ | $EARFCN_{Y11}$ $EARFCN_{Y14}$ | |
| | UMTS-WCDMA | $UARFCN_{Y11}$ $UARFCN_{Y12}$ | $UARFCN_{Y11}$ $UARFCN_{Y13}$ | $UARFCN_{Y11}$ | $UARFCN_{Y11}$ |
| Y2 | LTE-FDD | $EARFCN_{Y21}$ | $EARFCN_{Y21}$ | $EARFCN_{Y21}$ | $EARFCN_{Y21}$ $EARFCN_{Y22}$ |
| | UMTS-WCDMA | $UARFCN_{Y21}$ $UARFCN_{Y22}$ | $UARFCN_{Y21}$ $UARFCN_{Y22}$ | $UARFCN_{Y21}$ | $UARFCN_{Y22}$ |

As shown above, the US network operator X1 deploys a common LTE band 17 $EARFCN_{X11}$ in LTE cells that are deployed in all major airports in the US; similarly Canadian network operator Y1 deploys a common UMTS band 5 $UARFC_{Y11}$ in UMTS cells in all major airports in Canada. Airports are only one example of locations where cellular transceiver activation commonly occurs.

As part of one implementation, a frequency list named " Home Network Likely Frequency List" is created for each network operator that represents the frequency number (ARFCN/UARFCN/EARFCN) of most likely downlink centre frequency across all the RATs—the list is ordered based on likelihood of occurrence of such frequencies in all major airports. The list may be generated via various methods or combination of methods, e.g. a frequency list may be hardcoded in mobile device software, built by the device as it discovers frequencies in home network, downloaded to the device in response to a list update trigger, etc. Such a trigger may be time-dependent, location-dependent, based on usage patterns, predicted travel, user command or any other condition that defines a trigger. The data may be pushed to the device or pulled. Examples of such lists are shown below:

| Home Network Likely Frequency List Index | Network Operator | LTE EARFCN List | UMTS UARFCN List |
|---|---|---|---|
| 1 | Y1 | $EARFCN_{Y11}$, $EARFCN_{Y12}$, | $UARFCN_{Y11}$, $UARFCN_{Y12}$ |
| 2 | Y2 | $EARFCN_{Y21}$, $EARFCN_{Y22}$ | $UARFCN_{Y21}$, $UARFCN_{Y22}$, $UARFCN_{Y23}$ |
| 3 | X1 | $EARFCN_{X12}$, $EARFCN_{X12}$, $EARFCN_{X13}$ | $UARFCN_{X11}$, $UARFCN_{X12}$, $UARFCN_{X13}$, $UARFCN_{X14}$ |
| 4 | X2 | $EARFCN_{X21}$, $EARFCN_{X22}$ | $UARFCN_{X21}$, $UARFCN_{X22}$, $UARFCN_{X23}$ |

Based on the information specified in various EFs (such as PLMN Selector, User Controlled PLMN Selector, Operator Controlled PLMN Selector EFs) on SIM/USIM that provides preferred roaming partners in a given country, another frequency list name "Roaming Network Likely Frequency List" is constructed to assist scanning for most likely roaming networks. Using this information, frequencies of different PLMNs in a given foreign country are prioritized; e.g. if SIM/USIM of Operator X1 indicates that Network Operator Y1 is preferred over Network Operator Y2 in Country Y, then home network likely frequencies of Network Operator Y1 appear before Network Operator Y2 in Roaming Network Likely Frequency List that is constructed for Network Operator X1.

The following Roaming Network Likely Frequency List may be created as follows:

| Network Operator | Roaming Network Likely Frequency List Indices of Home Network Likely Frequency List of roaming partners |
|---|---|
| Y1 | Index 3 (i.e. Home Network Likely Frequency List of X1) |
| Y2 | Index 4 (i.e. Home Network Likely Frequency List of X2) |
| X1 | Index 1 (i.e. Home Network Likely Frequency List of Y1) Index 2 (i.e. Home Network Likely Frequency List of Y2) |
| X2 | Index 2 (i.e. Home Network Likely Frequency List of Y2) |

As a further embodiment, Roaming Network Likely Frequency List for a given carrier comprises multiple RAT-specific lists—each one representing all likely frequencies on a given RAT such as GSM/EDGE, UMTS-WCDMA, UMTS-TDSCDMA, LTE-FDD, LTE-TDD etc.

The Roaming Network Likely Frequency List may also include frequencies that are common amongst a number of network operators in different countries. In general, there may be multiple Roaming Network Likely Frequency Lists, one for each region (e.g. Americas, Europe, Middle East, Asia, Africa, Oceania, etc.). The scan order among various regional lists may be prioritized based on various factors such as an initial location of the user, user's travel history, etc.

The likely frequency list is most efficiently stored directly in a memory of the mobile device or it may be stored in an external memory device accessible by the mobile device without cellular connectivity, e.g. accessible by universal serial bus (USB), near field communication (NFC), Wi-Fi®, Bluetooth®, or any suitable wired or wireless data-transfer interface. The rapid network-selection method may be implemented by a mobile device which include a wireless communications device, tablet, personal digital assistant, cell phone, smart phone, smart watch, smart wearable accessory, gaming device or any other portable electronic device or portable communication device.

Figure 1:
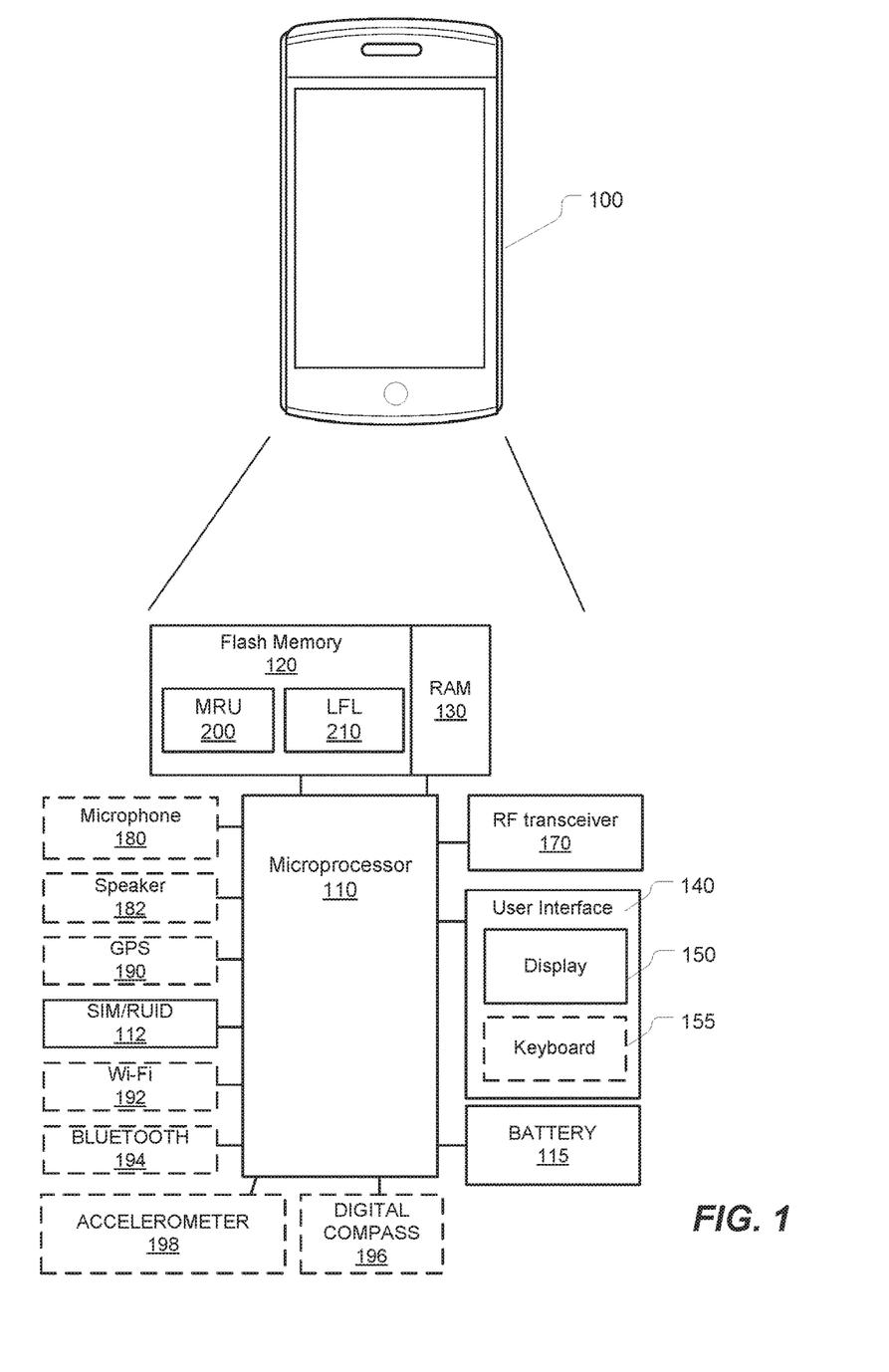
FIG. 1 is a depiction of a mobile device capable of implementing a rapid network selection technique.

FIG. 1 is a depiction of one example of a mobile device capable of performing a rapid network selection. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devices, such as a display screen 150 (e.g. an LCD or LED screen or touch-sensitive display screen), and may optionally include a keyboard or keypad. The user interface may also include an optical jog pad and/or a thumbwheel, trackball, track pad or equivalent.

As depicted by way of example in FIG. 1, the mobile device 100 may include a cellular radio transceiver 170 for communicating with other devices. The cellular radio transceiver 170 enables wireless communication with one or more base stations over a cellular wireless network using cellular communication protocols and standards for both voice calls and packet data transfer such as GSM, CDMA, GPRS, EDGE, UMTS, LTE, etc. Once the desired cellular network is identified, the mobile device 100 connects to the cellular network via a base transceiver station (BTS), base station controller (BSC), Serving GPRS Support Node (SGSN), and Gateway GPRS Support Node (GGSN). In an LTE implementation, the mobile device connects via eNode B (base station), mobility management entity (MME) and serving gateway (SGW).

The mobile device 100 may include a Subscriber Identity Module (SIM) card 112 or Universal Subscriber Identity Module (USIM) for GSM-type devices or a Re-Usable Identification Module (RUIM) card for CDMA-type devices. For the purposes of this specification, the term SIM shall include a USIM. The RF transceiver 170 may include separate voice and data channels.

The mobile device 100 may also include one or more ports for wired connections, e.g. USB, HDMI, FireWire (IEEE 1394), etc.

The mobile device 100 optionally includes a speech-recognition subsystem that has a microphone 180 for transforming voice input in the form of sound waves into an electrical signal. Optionally, the mobile device 100 may include a speaker 182 and/or an earphone jack.

The mobile device 100 optionally includes a position-determining subsystem such as a global navigation satellite system (GNSS) receiver, for example a Global Positioning System (GPS) receiver 190 (e.g. in the form of a chip or chipset) for receiving GNSS (e.g. GPS) radio signals transmitted from one or more orbiting GNSS (e.g. GPS) satellites.

The mobile device 100 includes a Wi-Fi transceiver 192 (which may, in some embodiments, be just a Wi-Fi receiver) for receiving a Wi-Fi signal transmitted by a Wi-Fi access point, router, adapter or hotspot. Although Wi-Fi® is a registered trademark of the Wi-Fi Alliance, it shall be identified simply as "Wi-Fi" in this specification. Wi-Fi encompasses the IEEE 802.11 standard and all its drafts and amendments.

The mobile device 100 optionally includes a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or accelerometer 198. Other sensors may include a tilt sensor, gyroscope or equivalent.

The processor 110 of the mobile device 100 (which is coupled to the cellular radio transceiver 170 via a data bus) activates the cellular radio transceiver in response to a trigger, e.g. a user command or detection of a condition. The memory 120, 130, which is coupled to the processor 110, stores a most recently used (MRU) frequency list 200 of radiofrequency channels most recently used by the cellular radio transceiver of the mobile device. The memory 120, 130 also stores a likely frequency list (LFL) 210 of likely radiofrequency channels available at a plurality of locations where activation of cellular radio transceivers commonly occurs. The processor 110 is configured to scan the most recently used frequency list and the likely frequency list and to select the cellular network by identifying one of the radiofrequency channels as a usable channel, i.e. an RF channel that can be used by the mobile device to communicate with a base transceiver station (BTS) or Node B.

Figure 2:
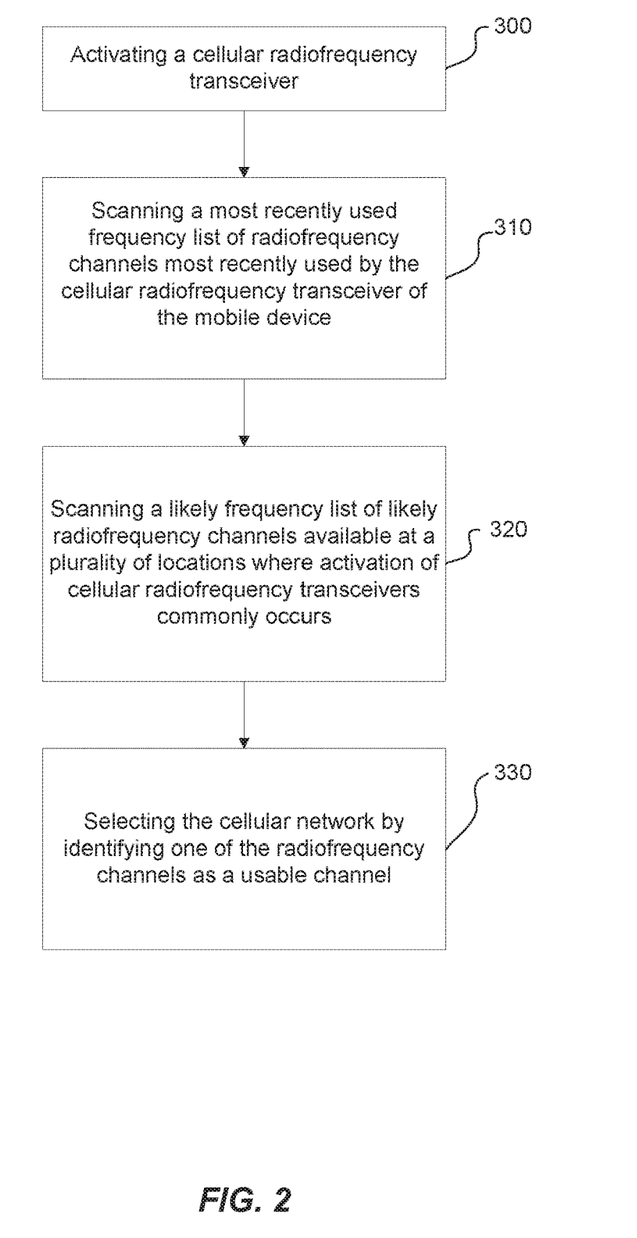
FIG. 2 is a flowchart outlining a method of selecting a cellular network.

An overview of one rapid network-selection method is described with reference to FIG. 2. As depicted in the flowchart of FIG. 2, the method entails steps, acts or operations of activating (300) a cellular radio transceiver, scanning (310) a most recently used frequency list of radiofrequency channels most recently used by the cellular radio transceiver of the mobile device, scanning (320) a likely frequency list of likely radiofrequency channels available at a plurality of locations where activation of cellular radio transceivers commonly occurs, and selecting (330) the cellular network by identifying one of the radiofrequency channels as a usable channel. The usable channel means any pair of uplink and downlink frequencies (e.g. as defined by an AFRCN) over which the mobile device can communicate with a base station transceiver. In one embodiment, the likely frequency list includes only one ARFCN per location. In another embodiment, the likely frequency list includes more than one ARFCN per location. The actual ARFCN and the number of ARFCN's stored per location may be dynamically changed by the mobile device software or pushed to the device via various forms of device provisioning.

The step of activating the cellular RF transceiver triggers the scanning for a usable channel, i.e. causes the device to perform a rapid network selection scan. The activating step may be any one of the following: powering on the mobile device, turning on the RF transceiver, disabling an airplane mode, disabling a bedside mode, returning from an out-of-coverage area or any event that causes the RF transceiver to search for a network.

The method may be further refined by taking into consideration whether the mobile device was roaming when the RF transceiver was deactivated and/or whether a SIM card has been swapped.

In some instances, a mobile user may swap a home SIM card for a foreign country SIM card to minimize or avoid roaming charges. The user may then replace the foreign country with the home country SIM card upon returning home. The most recently used (MRU) list may be different for each SIM card's Home PLMN.

The method may entail determining whether the mobile device was roaming when the cellular radio transceiver was deactivated. If the mobile device was roaming when the cellular radio transceiver was deactivated, the mobile device scans a roaming network likely frequency list. If, on the other hand, the mobile device was not roaming when the cellular radio transceiver was deactivated, the mobile device scans a home network likely frequency list. In other words, in this particular implementation, there are distinct home and roaming likely frequency lists. These lists may be stored together or separately. The home and roaming likely frequency lists may be stored in any suitable database or data structure.

Figure 3:
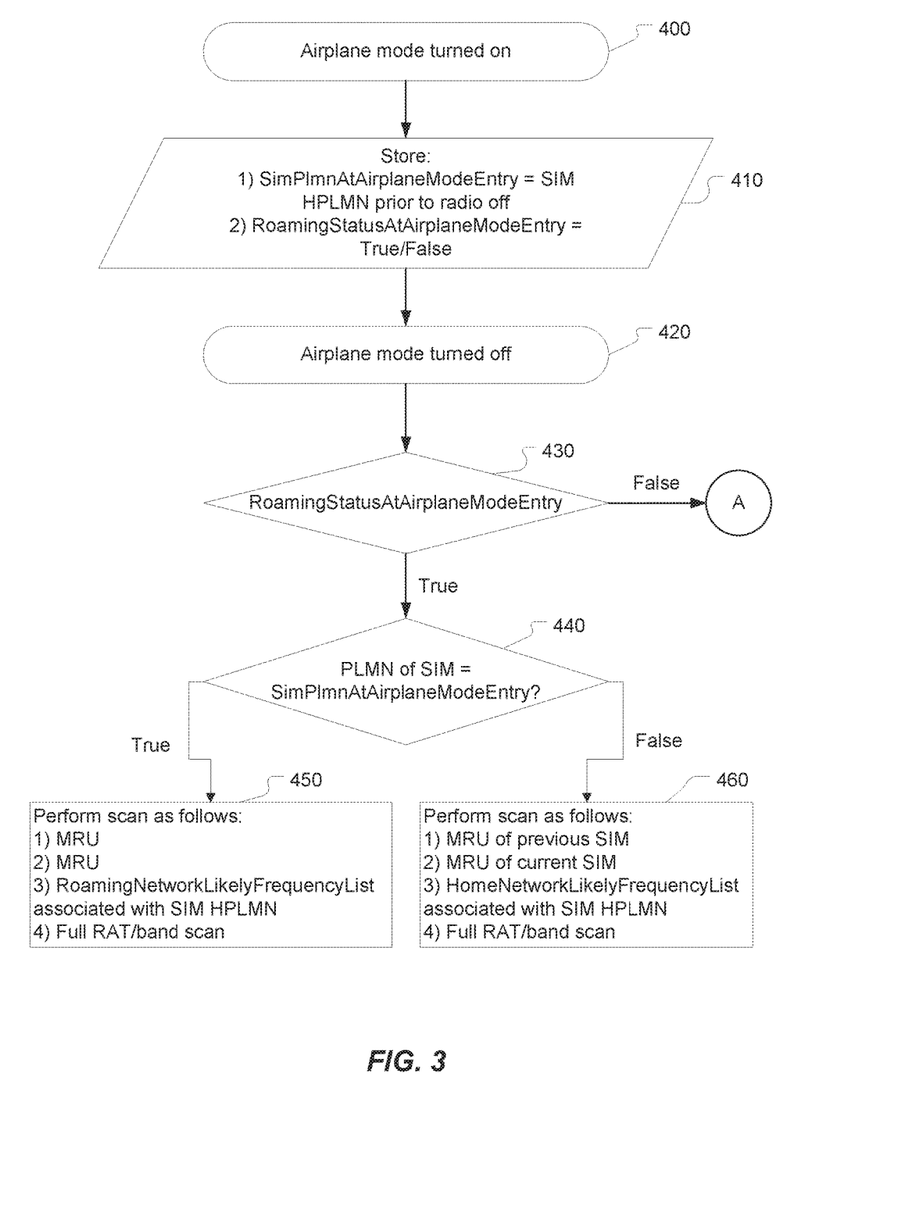
FIG. 3 is a flowchart of a specific method of selecting a cellular network.
Figure 4:
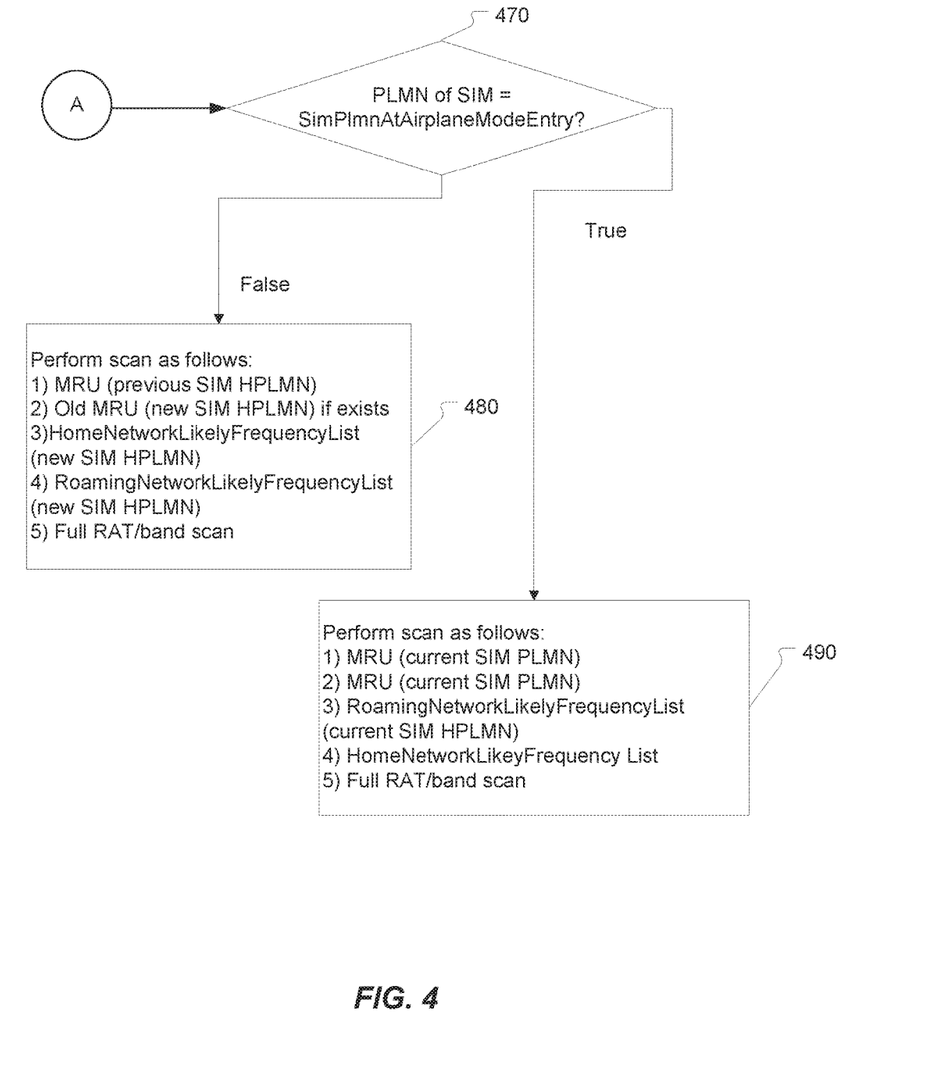
FIG. 4 is an extension of the flowchart of FIG. 3.

As shown by way of example in the specific implementation presented in FIGS. 3 and 4, if the mobile device was roaming when the cellular radio transceiver was deactivated, the mobile device scans the most recently used frequency list and the home network likely frequency if public land mobile network (PLMN) information stored in a subscriber identity module (SIM) does not match the PLMN information stored on the device upon deactivation of the transceiver. Alternatively, the mobile device scans the most recently used frequency list and the roaming network likely frequency list if the PLMN information in the SIM matches the PLMN information stored upon deactivation of the transceiver.

In the specific implementation of the method shown in FIG. 3 and FIG. 4, the method is initiated when the RF transceiver is deactivated, e.g. when airplane mode is enabled (at step 400) by a user of the mobile device. In response to the deactivation of the transceiver, the mobile device stores PLMN information and roaming status data at step 410, e.g. SimPlmnAtAirplaneModeEntry=SIM HPLMN prior to radio off and RoamingStatusAtAirplaneModeEntry=True/False in device memory. If the mobile device was roaming when airplane mode was entered, the roaming status is set to true. Otherwise, the roaming status is set to false, i.e. the device is not roaming.

At step 420, the airplane mode is turned off, causing the cellular radio transceiver to be activated and to search for a network to provide cellular service.

At step 430, the mobile device checks the stored roaming status to determine whether the mobile device was roaming when the cellular radio transceiver was deactivated in step 400. If the mobile device was indeed roaming, then the PLMN in the SIM is compared (at step 440) with the stored PLMN information. If there is a match, then scanning proceeds at step 450 in the following order: (1) a scan of the MRU associated with the PLMN of the current SIM; (2) a second scan of the MRU associated with the PLMN of the current SIM; (3) a scan of the Roaming Network Likely Frequency List associated with the SIM HPLMN; (4) a full RAT/band scan. If the PLMN information does not match, then it implies there is change of SIM and scanning is performed as per step 460 as follows: (1) a scan of the MRU list associated with the PLMN of the previous SIM; (2) a scan of the MRU list associated with the PLMN of the current SIM if such an MRU list exists; (3) a scan of the HomeNetworkLikelyFrequencyList associated with the SIM HPLMN; (4) a full RAT/band scan.

If the mobile device was not roaming (as determined by the mobile device at decision block 430), then the method flow proceeds as shown in FIG. 4. As shown in FIG. 4, the mobile device then determines (at decision block 470) whether the PLMN information in the SIM matches the stored PLMN information at the time airplane mode was activated ("Does PLMN of SIM=SimPlmnAtAirplaneModeEntry?"). The mobile device then determines if the PLMN information in the SIM matches the PLMN information stored on the device upon deactivation. If there is a mismatch, then it indicates that the user has changed the SIM from a previous SIM to a new SIM and the mobile device performs (at step 480) the scans in the following order until a usable channel is found: (1) a scan of an MRU list associated with the PLMN of the previous SIM/USIM; (2) a scan of the MRU list associated with the PLMN of the new SIM if such an MRU list exists; (3) a scan of a Home Network Likely Frequency List associated with the PLMN of the new SIM; (4) a scan of a Roaming Network Likely Frequency List associated with the PLMN of the new SIM; and (5) a full RAT/band scan. If there is a match determined at step 470, the mobile device performs (at step 490) the scans in the following order until a usable channel is found: (1) a scan of the MRU list associated with the PLMN of the current SIM, i.e. the SIM currently in the mobile device since no SIM swap has occurred; (2) a scan of the MRU list associated with the PLMN of the current SIM for the second time to provide time-domain diversity; (3) a scan of the Roaming Network Likely Frequency List associated with the PLMN of the current SIM); (4) a scan of the Home Network Likely Frequency List associated with the PLMN of the current SIM; and (5) a full RAT/band scan.

Figure 5:
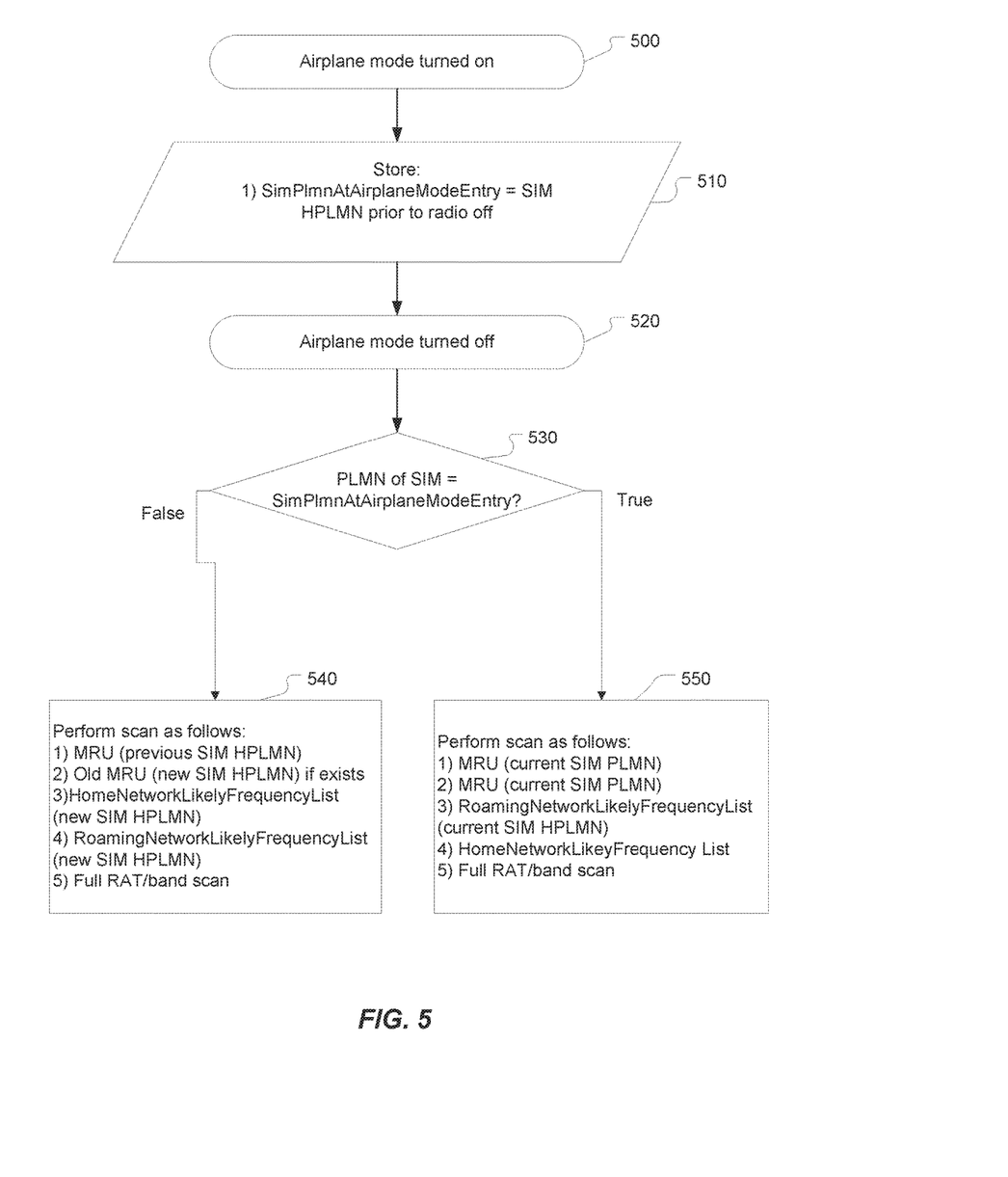
FIG. 5 is a flowchart of a simplified method of selecting a cellular network.

FIG. 5 depicts a simplified method for network selection. As shown by way of example in FIG. 5, the simplified method is initiated when the RF transceiver is deactivated, e.g. when airplane mode is enabled (at step 500) by a user of the mobile device. In response to the deactivation of the transceiver, the mobile device stores PLMN information at step 510, e.g. SimPlmnAtAirplaneModeEntry=SIM HPLMN prior to radio off. Unlike the method of FIGS. 3-4, the method of FIG. 5 does not need to determine whether the device was roaming when airplane mode was entered. At step 520, the airplane mode is turned off). At step 530, the mobile device determines whether the PLMN information in the SIM matches the PLMN information stored in the device when airplane mode is disabled. If there is a mismatch, then it indicates that the user has changed the SIM from a previous SIM to a new SIM and the mobile device performs (at step 540) the scans in the following order until a usable channel is found: (1) a scan of the MRU list associated with the PLMN of the previous SIM/USIM; (2) a scan of the MRU list associated with the PLMN of the new SIM if such an MRU list exists; (3) a scan of the Home Network Likely Frequency List associated with the PLMN of the new SIM; (4) a scan of the Roaming Network Likely Frequency List associated with the PLMN of the new SIM; and (5) a full RAT/band scan. If there is a match determined at step 530, the mobile device performs (at step 550) the scans in the following order until a usable channel is found: (1) a scan of the MRU list associated with the PLMN of the current SIM; (2) a scan of the MRU list associated with the PLMN of the current SIM for the second time to provide time-domain diversity; (3) a scan of the Roaming Network Likely Frequency List associated with the PLMN of the current SIM; (4) a scan of the Home Network Likely Frequency List associated with the PLMN of the current SIM; and (5) a full RAT/band scan.

The example of entering and exiting airplane mode depicted in FIGS. 3-5 is presented solely to illustrate one way of deactivating and reactivating the cellular radio transceiver. The methods of FIGS. 3-5 may be performed using any other deactivation and reactivation technique including, for example, manually turning off and on the cellular radio transceiver, or powering down the mobile device and then powering up the mobile device. The methods may be used for scenarios when the mobile device has experienced an extended loss of wireless coverage or a long period without battery power.

From the foregoing, it is to be noted that any of the above methods may involve defining a PLMN/SIM-specific list of MRU frequencies that are stored in the mobile device for searching. The mobile device may store a plurality of such lists that are specific to each PLMN/SIM combination.

In the implementations depicted in FIGS. 3-5, the processor of the mobile device is configured to detect a change in SIM (or USIM) at the time the cellular radio transceiver is activated.

In a further implementation, the mobile device requests an updated likely frequency list in response to detecting that the mobile device has arrived at an airport. Detecting that the mobile device may be done by comparing GPS coordinates against a database of known airport locations. A calendar application or travel application may also be used to provide an indication that the user of the mobile device is planning to take a flight. The updated list may also be downloaded as part of the power down sequence or an RF transceiver shutdown sequence or in response to enabling the airplane mode or other mode that deactivates the cellular RF transceiver.

In a further implementation, the mobile device is configured to learn or discover (i.e. obtain) the likely frequency list by monitoring available channels at the plurality of locations. In a variant, the mobile device may share learned channel data with other mobile devices via a server or via a peer-to-peer (P2P) platform. The channel data may also specify the received signal strength at the location (e.g. at the airport).

In a further variant, the frequency channels in the likely frequency list may be prioritized based on user travel patterns, based on events stored by a calendar application or based on travel data stored by a travel application. For example, the user may travel to Fort Lauderdale, Fla. once per month. By noting this pattern, the mobile device can prioritize the frequencies to begin the search with the channel available at Fort Lauderdale International Airport (FLL). In another variant, an upcoming destination for the user may be determined by parsing e-mail, text message (e.g. SMS or MMS), social network posts, or other such content for names of destinations. For example, an e-mail or text message stating "See you in Fort Lauderdale!" may be used by the mobile device to determine that the next destination is probably Fort Lauderdale. In that case, the mobile device may prioritize the channels to commence with the channel at Fort Lauderdale International Airport (FLL).

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electro-magnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

The use of the terms "a" and "an" and "the" and similar referents or articles in this specification are to be construed to cover both the singular and the plural, unless otherwise indicated or clearly implied by the context. The terms "comprising", "having" and "including" are to be construed as open-ended terms (i.e. meaning "including, but not limited to,") unless otherwise noted.

This disclosure has been described in terms of specific embodiments, implementations and configurations which are intended to be examples only. Persons of ordinary skill in the art will appreciate, having read this disclosure, that many obvious variations, modifications and refinements may be made without departing from the inventive concept (s) presented herein. The scope of the exclusive right sought by the Applicant(s) is therefore intended to be limited solely by the appended claims.

The invention claimed is:

1. A method, performed by a mobile device, of selecting a cellular network, the method comprising:
   activating a cellular radio transceiver;
   determining that, at the time of activation of the cellular radio transceiver, a public land mobile network (PLMN) stored in a subscriber identity module (SIM) matches a home public land mobile network (HPLMN) stored in the mobile device;
   based on the determining that, at the time of activation of the cellular radio transceiver, the PLMN stored in the SIM matches the HPLMN stored in the mobile device:
      scanning a most recently used (MRU) frequency list of radiofrequency channels most recently used by the cellular radio transceiver of the mobile device, said MRU frequency list being associated with a current SIM PLMN;
      re-scanning the MRU frequency list of the current SIM PLMN to provide time-domain diversity;
      scanning a likely frequency list pushed or pulled to the mobile device, comprising radiofrequency channels available at a plurality of locations where activation of cellular radio transceivers is likely to occur, said likely frequency list being for a roaming network for the current SIM HPLMN;
      scanning a likely frequency list for a home network for the current SIM HPLMN; and
      performing a full RAT/band scan; and
      selecting the cellular network by identifying one of the radiofrequency channels as a usable channel.

2. The method as claimed in claim 1 further comprising:
   determining that the mobile device was roaming when the cellular radio transceiver was deactivated; and
   based on the determining that the mobile device was roaming when the cellular radio transceiver was deactivated, scanning a roaming network likely frequency list.

3. The method as claimed in claim 1 further comprising:
   determining that the mobile device was not roaming when the cellular radio transceiver was deactivated; and based on the determining that the mobile device was not roaming when the cellular radio transceiver was deactivated, scanning a home network likely frequency list.

4. The method as claimed in claim 1 wherein activating the cellular radio transceiver is performed by disabling an airplane mode.

5. The method as claimed in claim 1 wherein the plurality of locations are airports.

6. The method as claimed in claim 1 further comprising requesting an updated likely frequency list in response to detecting that the mobile device has arrived at an airport.

7. A non-transitory computer-readable medium comprising instructions in code which when loaded into a memory and executed by a processor of a mobile device cause the mobile device to:
   activate a cellular radio transceiver;
   determine that, at the time of activation of the cellular radio transceiver, a public land mobile network (PLMN) stored in a subscriber identity module (SIM) matches a home public land mobile network (HPLMN) stored in the mobile device;
   based on the determining that, at the time of activation of the cellular radio transceiver, the PLMN stored in the SIM matches the HPLMN stored in the mobile device:
      scan a most recently used (MRU) frequency list of radiofrequency channels most recently used by the cellular radio transceiver of the mobile device, said MRU frequency list being associated with a current SIM PLMN;
      re-scan the MRU frequency list of the current SIM PLMN to provide time-domain diversity;
      scan a likely frequency list pushed or pulled to the mobile device, comprising radiofrequency channels available at a plurality of locations where activation of cellular radio transceivers is likely to occur, said likely frequency list being for a roaming network for the current SIM HPLMN;
      scan a likely frequency list for a home network for the current SIM HPLMN; and
      perform a full RAT/band scan; and
   select the cellular network by identifying one of the radiofrequency channels as a usable channel.

8. The computer-readable medium as claimed in claim 7 further comprising code that causes the mobile device to:
   determine that the mobile device was roaming when the cellular radio transceiver was deactivated; and
   based on the determination that the mobile device was roaming when the cellular radio transceiver was deactivated, scan a roaming network likely frequency list.

9. The computer-readable medium as claimed in claim 7 further comprising code that causes the mobile device to:
   determine that the mobile device was not roaming when the cellular radio transceiver was deactivated; and
   based on the determination that the mobile device was not roaming when the cellular radio transceiver was deactivated, scan a home network likely frequency list.

10. The computer-readable medium as claimed in claim 7 wherein activating the cellular radio transceiver is performed by disabling an airplane mode.

11. The computer-readable medium as claimed in claim 7 wherein the plurality of locations are airports.

12. The computer-readable medium as claimed in claim 7 further comprising code for requesting an updated likely frequency list in response to detecting that the mobile device has arrived at an airport.

13. A mobile device comprising:
   a processor coupled to a cellular radio transceiver for activating the cellular radio transceiver and for determining that, at the time of activation of the cellular radio transceiver, a public land mobile network (PLMN) stored in a subscriber identity module (SIM) matches a home public land mobile network (HPLMN) stored in the mobile device; and
   a memory coupled to the processor for storing a plurality of most recently used (MRU) frequency lists of radiofrequency channels most recently used by the cellular radio transceiver of the mobile device and for storing a plurality of likely frequency lists pushed or pulled to the mobile device, comprising radiofrequency channels available at a plurality of locations where activation of cellular radio transceivers is likely to occur;
   wherein the processor is configured to:
      based on the determining that, at the time of activation of the cellular radio transceiver, the PLMN stored in the SIM matches the HPLMN stored in the mobile device:
         scan a MRU frequency list associated with a current SIM PLMN;
         re-scan the MRU frequency list of the current SIM PLMN to provide time-domain diversity;
         scan a likely frequency list for a roaming network for the current SIM HPLMN;
         scan a likely frequency list for a home network for the current SIM HPLMN; and
         perform a full RAT/band scan; and
      select the cellular network by identifying one of the radiofrequency channels as a usable channel.

14. The mobile device as claimed in claim 13 wherein the processor is configured to:
   determine that the mobile device was roaming when the cellular radio transceiver was deactivated; and
   based on the determination that the mobile device was roaming when the cellular radio transceiver was deactivated, scan a roaming network likely frequency list.

15. The mobile device as claimed in claim 13 wherein the processor is configured to:
   determine that the mobile device was not roaming when the cellular radio transceiver was deactivated; and
   based on the determination that the mobile device was not roaming when the cellular radio transceiver was deactivated, scan a home network likely frequency list.

16. The mobile device as claimed in claim 13 wherein the cellular radio transceiver is activated by disabling an airplane mode.

17. The mobile device as claimed in claim 13 wherein the plurality of locations are airports and wherein the processor causes the mobile device to request an updated likely frequency list in response to detecting that the mobile device has arrived at an airport.

18. The mobile device as claimed in claim 13 wherein the processor is configured to:
   define a list of MRU frequencies that are specific to a particular combination of a PLMN and a SIM;
   store said list in the memory; and
   in response to detecting activation of the cellular radio transceiver, scan said list.

19. The mobile device as claimed in claim 13 wherein the likely frequency list is downloaded in response to a list update trigger.

* * * * *